United States Patent [19]
Boman

[11] Patent Number: 5,469,175
[45] Date of Patent: Nov. 21, 1995

[54] SYSTEM AND METHOD FOR MEASURING DISTANCE BETWEEN TWO OBJECTS ON A GOLF COURSE

[75] Inventor: Bertho Boman, Fort Lauderdale, Fla.

[73] Assignee: Golf Scoring Systems Unlimited, Inc., Davie, Fla.

[21] Appl. No.: 38,268

[22] Filed: Mar. 29, 1993

[51] Int. Cl.[6] ............................ G01S 5/02; G01S 3/02; A63B 55/00; G01C 21/00
[52] U.S. Cl. ................ 342/357; 273/32 R; 342/457; 342/458; 364/444
[58] Field of Search ............................ 342/357, 450, 342/451, 457, 458; 364/444, 449, 460, 561; 273/32 B, 32 H, 213

[56] References Cited

U.S. PATENT DOCUMENTS

| | | | |
|---|---|---|---|
| 4,751,512 | 6/1988 | Longaker | 342/357 |
| 4,815,020 | 3/1989 | Cormier | 364/561 |
| 4,864,854 | 9/1989 | Van Leemput | 73/189 |
| 4,870,687 | 9/1989 | Deleon | 364/561 |
| 4,894,655 | 1/1990 | Joguet et al. | 342/357 |
| 4,949,089 | 8/1990 | Ruszkowski, Jr. | 342/357 |
| 4,977,509 | 12/1990 | Pitchford et al. | 364/449 |
| 5,056,106 | 10/1991 | Wang et al. | 375/1 |
| 5,272,483 | 12/1993 | Kato | 342/357 |
| 5,364,093 | 11/1994 | Huston et al. | 340/323 R |

FOREIGN PATENT DOCUMENTS

| | | | |
|---|---|---|---|
| 0134513 | 6/1991 | Japan | 342/357 |

OTHER PUBLICATIONS

Beser et al., "The Application of NAVSTAR Differential GPS in The Civilian Community", *Navigation*, vol. #, 1984 pp. 167–196.

*Primary Examiner*—Gregory C. Issing
*Attorney, Agent, or Firm*—Kenneth E. Merklen; Ralph A. Dowell

[57] ABSTRACT

A global position receiver receives navigation signal from navigation satellites, in space, from a fixed location on a golf course, the location defined in stable location data. Location data derived from the navigation signals defines the fixed location in unstable location data. The stable location data and the unstable location data are compared for generating an error signal. A mobile global position receiver, on a fairway of the golf receives concurrently transmitted navigation signals from the navigation satellites from an undefined location. Location data derived from the navigation signals by the mobile unit defining the location of the mobile unit in unstable location data is combined with the error signal generating stable location data defining the undefined location of the mobile unit on the fairway. The distance and direction of a golf ball from the mobile unit, are measured. The stable location data, defining the location of the mobile unit, is combined with the measured distance and direction and stable location data defining the location of the golf ball is obtained, The distance between the golf ball and the hole on the green, the location of which is fixed and known in compatible location data, is measured by simple mathematics.

32 Claims, 6 Drawing Sheets

SYSTEM AND METHOD FOR MEASURING DISTANCE BETWEEN TWO OBJECTS ON A GOLF COURSE

BACKGROUND OF THE INVENTION

1. Field of the Invention

The present invention relates to electronic communication systems for determining a measurement of the distance between two objects from a position remote from both objects. In particular, the invention is directed to an electronic system and method for determining a measurement of the distance between two objects on earth, wherein the location of one of the objects is known in a location defining data and the location of the other objects is known, but not in location defining data. The invention is particularly useful for determining a measurement of the distance between a golf ball, positioned on the fairway of a golf course, and the hole or pin on a green associated with the fairway on the golf course.

2. Prior Art

In playing the game of golf on a golf course, the player is provided with the distance, in yardage, from the tee to the pin or hole on the green for the "hole" being played. For the sake of clarity, the hole on a green of a golf course will, hereinafter be referred to as pin and the hole on a golf course, which includes the tee, the fairway and the green, will hereinafter be referred to as "hole". It will be appreciated that the hole on the green receives the shaft of a flag which identifies the number of the "hole" and that the term flag, and pin, and hole on the green all relate to and identify the same point. Often the distance between the tee or tee-off point and the pin is much farther than the ball is driven with a golf club, in a single stroke. It is usual for a golfer to drive a golf ball short of the green of the "hole" being played where the "hole" is rated par four or par five, for example. Once a golf player drives a golf ball off the tee, toward the green of the "hole" being played, the golfer is essentially left on his own to determine the yardage between the golf ball, laying on the fairway, and the pin on the green of the "hole" being played.

The prior art includes devices and systems which may be used by the golfer for determining the approximate distance between the pin and a point that approximates the location of the golf ball laying on the fairway but, for the most part, the prior art does not teach apparatus which provide a precise measurement, in standard measurement terms, of the distance between a golf ball laying on a fairway and the pin on the green associated with that fairway. U.S. Pat. No. 4,136,394, issued to Josies, et al, titled Golf Yardage Indicator System, issued in 1979, teaches a multi-unit system in which a transponder is mounted on or near the pin on the green. A portable complex transmitter/receiver carried by the golf player, is used to transmit a signal to the transponder on the green and the transponder, in response, transmits a data signal that picked up by the portable receiver. The data is analyzed for determining the distance between the transponder and the portable transmitter/receiver. The data signal is in the sonic range and sonic waves are subject to variances when projected through air, such as by air temperature and humidity. Also, a golf course usually has many changes in ground elevation which may require that the transponder be mounted above the ground, such as on the shaft of the flag used to identify the hole and green. This leads to problems because the shaft/flag is often removed from the hole on the green when golf players are playing on the green. With the shaft/flag removed from the hole the transponder on longer identifies with the hole on the green.

U.S. Pat. No. 5,044,634 to Dudley, titled Golf Information System teaches burying wires of a grid in the ground of a fairway. The grid wires emit signals which are read by a receiver. However, this system does not locate a ball lying between wires of the grid which, in order to practice the invention must be buried in the fairway. In order to bury a wire grid in the fairway, the fairway must be dug up. This is extremely expensive and interferes with the use of the golf course lot playing golf. U.S. Pat. No. 5,046,839 to Krangle, titled Golf Course Range Finder System teaches a hand-held range finder device emitting light pulses that are reflected by a reflector mounted on the shaft of the flag. This system has some of the same problems attendant with the Josies, et al teaching, plus the additional problem that in order to use the Krangle system an unobstructed view of the shaft/flag is required.

U.S. Pat. No. 3,868,692 to Woodard, et al, titled Golf Yardage Finder teaches the use of a mobile receiver and a transmitter located at the green. The transmitter emits signals which are received by the receiver and the receiver, which includes a signal field strength detecting device, measures the strength of the signal and converts the signal strength into yardage between the transmitter and the receiver, using the strength of the signal. Here again, the distance measured is the distance between the components of the measuring device, the transmitter and the receiver, not the transmitter and the ball on the fairway.

U.S. Pat. No. 4,480,310 issued to Alverez, titled Dead Reckoning Range Finding Device For Cart, teaches sensing devices, attached to a golf cart, for monitoring the wheels of the cart for measuring the distance and direction traveled by the cart. The Alvarez teaching is directed to measuring the distance and direction of the ball flight rather than measuring the distance between the ball, on the fairway, and the pin on the green.

U.S. Pat. No. 4,703,444 issued to Storms, Jr., et al, titled System For Determining Distance To And Location Of Features On A Golf Course, teaches positioning three or more remote, spaced transmitters on a golf course each of which transmit signals. A portable receiver, carried by a golfer, serves as an interrogation unit, receiving signals from the transmitters and, by triangulation, locates the position of the portable receiver. The portable receiver includes a keyboard for entering requests pertaining to distances between the receiver and another point or object on the golf course. As with other prior art, Storms, Jr., et al teaches a system which measures the distance from a receiving unit, rather than measuring from the ball on the fairway.

SUMMARY OF THE INVENTION

The present invention is an electronic communication system and method which accurately measures the distance between two objects, where the location of one of the objects is known, in coordinates and the location of the other object is known, but not in compatible terms or coordinates. The present invention is particularly useful in determining an accurate measurement of the distance between a golf ball, on the fairway of a golf course, and the hole or pin on a green of the golf course, for example. The present invention overcomes the disadvantages and shortcomings of the prior art by measuring the distance between the ball and the hole on the green rather than measuring the distance between the measuring device and the hole on the green, solving the problem in an entirely novel way.

From a broad aspect, the present invention provides a system and method by which navigation signals, transmitted from navigation satellites, in space, and received by a mobile, navigation signal receiving device, (the device hereinafter referred to as a global position receiver or GP receiver) is used to generate ground location data or coordinates, pin pointing, in stable, definite and accurate terms, the particular location of very small objects, such as a golf ball, for example.

When an object or point on the ground is fixed, such as a hole or pin on a green of a golf course, for example, a set of coordinates defining the pin point location of such object or point can be determined and noted. One method of determining coordinates defining the location of a hole or pin (hereinafter referred to as pin) on a green of a golf course, is to use a sextant to ascertain the exact latitude and longitude coordinates, defining the location in small incremental measurement terms. This may take time and effort, and may need the additional use of a chart and plotting apparatus, But, since the position of the pin is fixed and using a sextant and plotting the location of the pin on a chart may be done over an extended, interrupted period, and without interfering with golf players, coordinates or a set of coordinates, defining the exact location of the pin, may be obtained, and, since the pin location on the green is fixed, such coordinates can be preserved for later use.

When a golf player is playing golf on a golf course, it is normal to provide the golf player with the distance, in yardage, between the tee and the pin in which the ball is to be "sunk". However, often the golf ball driven, from the tee, falls substantially short of the green, especially where the "hole" is rated par four or par five. Prior to the golf player taking his "second shot", it is advantageous for the golfer to know, as accurately as possible, the measure of the distance, in yardage, between the golf ball, positioned on the fairway and the pin on the green of that fairway. Knowledge of the yardage between the golf ball and the pin is a factor in selecting the proper golf club to use for the next "shot".

When a golf ball is driven from the tee and lands on the fairway, substantially short of the green, it is not practical to determine the location of the ball by the same method used to determine the precise location of the pin.

A tape measure, stretched between the ball and the pin may be used to measure the distance between the ball and pin but this, also, is not practical, nor is the use of a tape measure acceptable while playing golf. Other methods, such as those proposed in the prior art may be used, but these, for the most part, measure the distance between the pin and the measuring device rather than the pin and the ball.

With the precise coordinates defining the location of the pin already known and preserved, the problem of finding precise, stable coordinates defining the location of the golf ball on the fairway remains. Precise, definite coordinates, defining the location of the golf ball on the fairway are needed in order to determine and measure the distance between the pin and the ball.

The present invention provides a system and method for determining the exact location of the golf ball on a fairway, in stable, definite coordinates which are compatible with the coordinates that define the location of the pin and, knowing the location of both the ball and the pin, each location being defined in sets of compatible coordinates that are both definite and stable, the distance between two locations defined by the coordinates may be determined and measured by simple mathematics.

Normally, locations defined by location coordinates derived from signals transmitted by navigation satellites are far too unstable and indefinite to positively locate a small object, such as a golf ball, for example. The instability and indefiniteness in the location coordinates derived from navigation signals transmitted by navigation satellites, are caused by noise and/or deviation signals on the normal navigation signals, some of which are inserted by government design, in order to avoid transmitting signals producing stable, definite coordinates defining pin point accurate locations. Other signal variations are a result of satellite flight variations. Although navigation signals can be processed into coordinates which clearly define a true, consistent location, the presence of noise and/or deviation signals prevent processing the signals into coordinates which define a location clearly, accurately and definitely.

However, by practicing the present invention, stable and definite ground coordinates, defining a highly accurate location of a small object, such as a golf ball, are derived from navigation signals transmitted from navigation satellites, by using two global position receivers (GP receivers) to receive concurrent navigation signals from navigation satellites in space even though the navigation signals transmitted by the satellites include noise and/or deviation signals which cause instability and indefiniteness in the coordinate data derived from the navigation signals.

A first, mobile GP receiver, positioned on a golf course, for example, in close proximity to a golf ball on the fairway, for example, is used to receive signals from the navigation satellites for converting such signals into location coordinates defining the location of the mobile GP receiver. These signals are subject to correction by an error signal generated by a second, fixedly positioned GP receiver, used to receive concurrently transmitted signals, from navigation satellites. The fixed GP receiver is used for detecting the effects of noise and/or deviation signals on location coordinate data derived from the navigation signals and for generating an error signal to overcome or eliminate the effect, on the coordinate data, of the noise and/or deviation signals on the navigation signals. The error signal generated by the fixed GP receiver is transmitted to the mobile GP receiver and is used, by the mobile GP receiver, to overcome or eliminate the effect of the noise and/or deviation signals on the location coordinates derived by the mobile GP receiver from the navigation signals received by the mobile GP receiver so that stable, definite coordinates defining the location of the mobile GP receiver may be obtained. After obtaining stable, definite coordinates defining the location of the mobile GP receiver on the golf course, the distance and direction of offset of the golf ball from the mobile GP receiver, are determined and the stable, definite coordinates, defining the location of the mobile GP receiver, are adjusted, with the offset, so as to define the location of the golf ball on the fairway of the golf course in stable, definite location coordinates.

The location of the golf ball having now been defined in stable, definite coordinates and the coordinates defining the location of the pin, previously discussed, being known and preserved, the distance between the two locations defined by the two sets of coordinates, i.e., the location of the golf ball and the location of the pin, can be determined by simple mathematics and may be expressed in a distance measurement, such as yardage, for example.

It will be appreciated that the location of the fixed GP receiver may be determined in location coordinates, using substantially the same or similar techniques used to determine the location coordinates of the pin on the green, for example. With the true location coordinates of the fixed GP receiver known, the coordinates derived from the navigation signals received from navigation satellites can be compared with the previously generated true location coordinates and any instability, indefiniteness and/or change from the true location coordinates can be recognized and may be considered a function of the noise and/or deviation signals on the navigation signals. An error or correction signal may then be generated by the fixed GP receiver, corresponding to the unstable and indefinite portions of the location coordinates.

In the preferred embodiment of the invention, the error signals generated by the fixed GP receiver are derived from the unstable and indefinite portions of the coordinates derived from the navigation signals. The error or correction signals may correspond, inversely to the unstable and indefinite portions of the location coordinates defining the location of the fixed GP receiver. The error or correction signals are used by the mobile GP receiver to stabilize and make definite the unstable and indefinite coordinates derived by the mobile GP receiver defining its location.

Alternatively, an error or correction signal may be derived by a fixed GP receiver from the navigation signals which carry the noise and/or deviation signals and the error or correction signal may be used by the mobile GP receiver to eliminate or overcome the effect of the noise and/or deviation signals carried by the navigation signals.

In accordance with the invention, the location of a golf ball on the fairway of a golf course is defined by stable and definite coordinates by a mobile GP receiver in which a GP receiver, located in a fixed, known and defined location, such as the club house of the golf course, or the proshop of the golf course, for example, is used to create an error or correction signal corresponding to the instability and indefiniteness of the coordinates derived from navigation signals transmitted by navigation satellites, defining the location of the fixed GP receiver. Since the GP receiver does not move from its fixed location, coordinates, derived from navigation signals received by it, defining its location, may be expected to be stable, consistent and definite. Any change in the stability, consistency or definiteness in the coordinates defining the location of the fixed GP receiver from its known location are viewed as caused by noise and/or deviation signals on the navigation signals. The error or correction signal, which is generated corresponds to the inverse of any change or instability in derived location coordinates from known location coordinates defining the fixed location of the fixed GP receiver.

This error or correction signal is transmitted to and used, by a mobile GP receiver to overcome or eliminate the instability and indefiniteness in location coordinates derived from navigation signals transmitted by navigation satellites, defining the location of the mobile GP receiver, caused by the noise and/or deviation signals on the navigation signals. The resultant coordinates define the location of the mobile GP receiver in stable, definite location coordinates. These stable and definite coordinates are adjusted by the distance and direction of offset of a golf ball, from the defined location of the mobile GP receiver. The adjusted location coordinates define the location of the golf ball, in stable, definite coordinates.

The previously known location of the pin on the green, may be expressed in coordinates which are compatible with the coordinates defining the location of the ball on the fairway. Simple mathematics are used to determine the differential between the two sets of coordinates and the differential is expressed in a measure of distance, preferably yardage, between the golf ball and the pin. Thus an accurately measured distance, in yardage, between the golf ball on the fairway and the pin on the green is obtained.

The distance measurement between the ball and the pin, described above is an absolute distance. The invention also provides the golfer with a measurement of the apparent distance between the golf ball and the pin by sensing the windage at the ball position. Since the two sets of location coordinates defining the location of the ball and the pin respectively are ground coordinates, the line of flight of the ball to the pin is known. By using a windage sensor the direction and velocity of the wind may be determined. Vector forces representing the absolute flight of the ball and the direction and velocity of the wind may be calculated and the apparent distance and proposed flight of the ball to the pin may be determined. The absolute distance and the apparent distance may be displayed or otherwise made known to the golfer. This data provided to the golfer may be used is selecting a golf club for the next stroke or shot.

It is usual, when playing a round of golf on a golf course, to use a golf cart for transportation for the golf player and the golf clubs. The transportation may be motorized golf cart or may be a hand pulled golf cart. Golf carts may be used in conjunction with the present system, both as a source of transportation and as a source of electric power for the mobile GP receiver. If desired, the player or caddy serving the player may carry or transport the mobile GP receiver. In such case the electric power for driving the mobile unit may be in the form of a portable battery pack.

The invention is described relative to determining a measurement of distance between a golf ball and a pin on a golf green. However, the pin may represent a pin, per se or any other object and/or hazard on a golf course. The system may be used on a golf club with one golf course or more than one golf course.

DETAILED DESCRIPTION OF THE INVENTION

The present invention may be used as an independent system with a fixed or central unit and one or more mobile units. The invention may also be used in conjunction with a golf course computer system, the golf course computer system being well known in the art. A golf course computer system generally includes a central computer or controller which is located in some fixed location on the golf course, such as in the club house of the golf course, for example, and a plurality of mobile or portable golf computers, with the mobile or portable golf computer transported along the golf course with a golf player or group or set of golf players. Examples of a golf course computer system with mobile golf cart computers are taught and described in U.S. Pat. No. 4,910,677 issued Mar. 20, 1990 to Remedio, et al and in U.S. Pat. No. 5,095,430 issued Mar. 10, 1992 to Beneto, et al.

It should be understood that the invention herein disclosed in the embodiments described below is not limited to such embodiments or details and that in practicing the invention other embodiments and arrangements may be used.

For the purposes of this disclosure, it is herein assumed that the navigation signals receiving antenna on a mobile cart is centrally located on the cart and that the cart dimensions are known. This is a factor in pin pointing the location of a golf ball which lies offset from the golf cart, on the fairway. It is further assumed that the location of the receiving antenna for receiving navigation signals is the location of the GP receiver, which is the location of the mobile cart.

Figure 1:
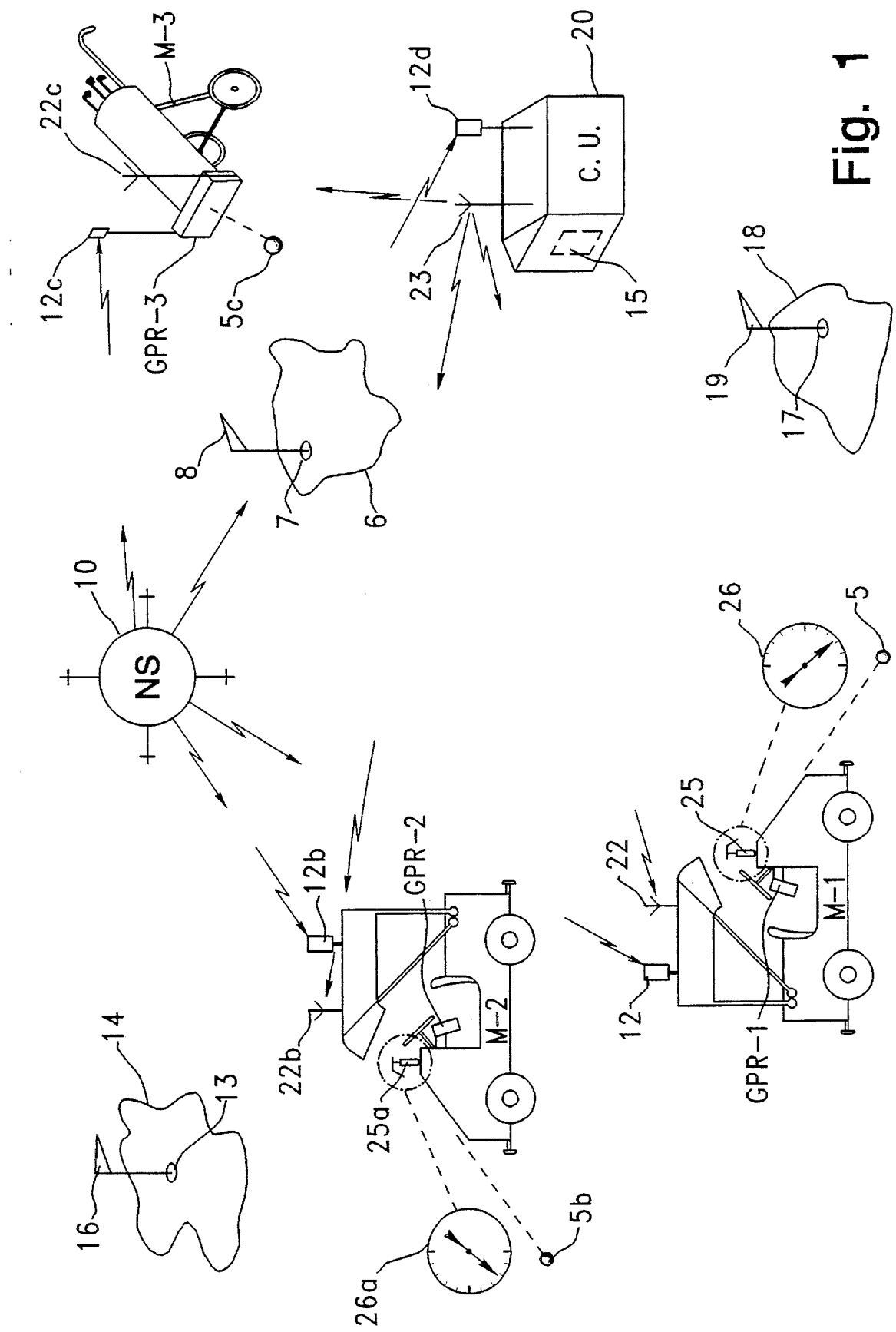
FIG. 1 is a pictorial representation of the invention in use on a golf course.

Referring to FIG. 1, the invention is pictorially represented in use on a golf course. A navigation satellite NS is represented at 10, The satellite 10 represents one or more navigation satellites, in space for the purpose of transmitting radio navigation signals which may be received and converted into digital data, which defines the location, on earth, where the signals are being received. The digital data are coordinates which define the location of the receiving antenna. The characteristics of the navigation signals transmitted by navigation satellites and the coordinates derived from such navigation signals were previously discussed.

Three mobile vehicles, motorized golf cart M-1 and M-2 and hand drawn cart M-3 are represented on a golf course. These vehicles represent additional such vehicles used in the system. The golf course is represented by the greens 6, 14 and 18, of which there are usually eighteen greens for each golf course and each golf club may have one or more golf courses. Each green 6, 14 and 18 has a respective hole 7, 13 and 17, with a respective shaft and flag 8, 16 and 19, positioned in the hole. Each golf cart is represented on a fairway of the golf course with a respective golf ball 5, 5b and 5c, positioned in close proximity to the golf cart on the respective fairway. Each mobile cart transports a mobile unit, represented by GPR-1, GPR-2 and GPR-3, located in the respective mobile carts. Each mobile unit includes a GP receiver and antenna tuned to receive navigation signals from the navigation satellites 10. The antenna connected to the respective mobile GP receiver is represented at 12, 12b and 12c, respectively.

Each mobile unit, of which there may be one or more in the system, also includes a data receiver with an antenna, represented at 22, 22b and 22c, respectively, The data receiver receives data transmitted by a data transmitter located in the central or fixed unit C.U., via antenna 23. In addition, as represented in more detail in FIG. 3, the mobile unit includes a mobile computer for controlling the functions of the mobile unit, for making calculations, for using the error or correction signals received from the fixed unit, for generating stable location coordinates for locating the mobile unit, for generating the location coordinates for locating the ball and for calculating the measurement of the distance between the ball and the pin.

The central or fixed unit, represented at C.U., of which there is one for each system, includes a fixedly located GP receiver 15 with fixed antenna 12d tuned to receive navigation signals from navigation satellites 10. Although the fixed GP receiver is represented as being located with the central unit, it should be understood that the fixed GP receiver may be located at any convenient location.

Figure 4:
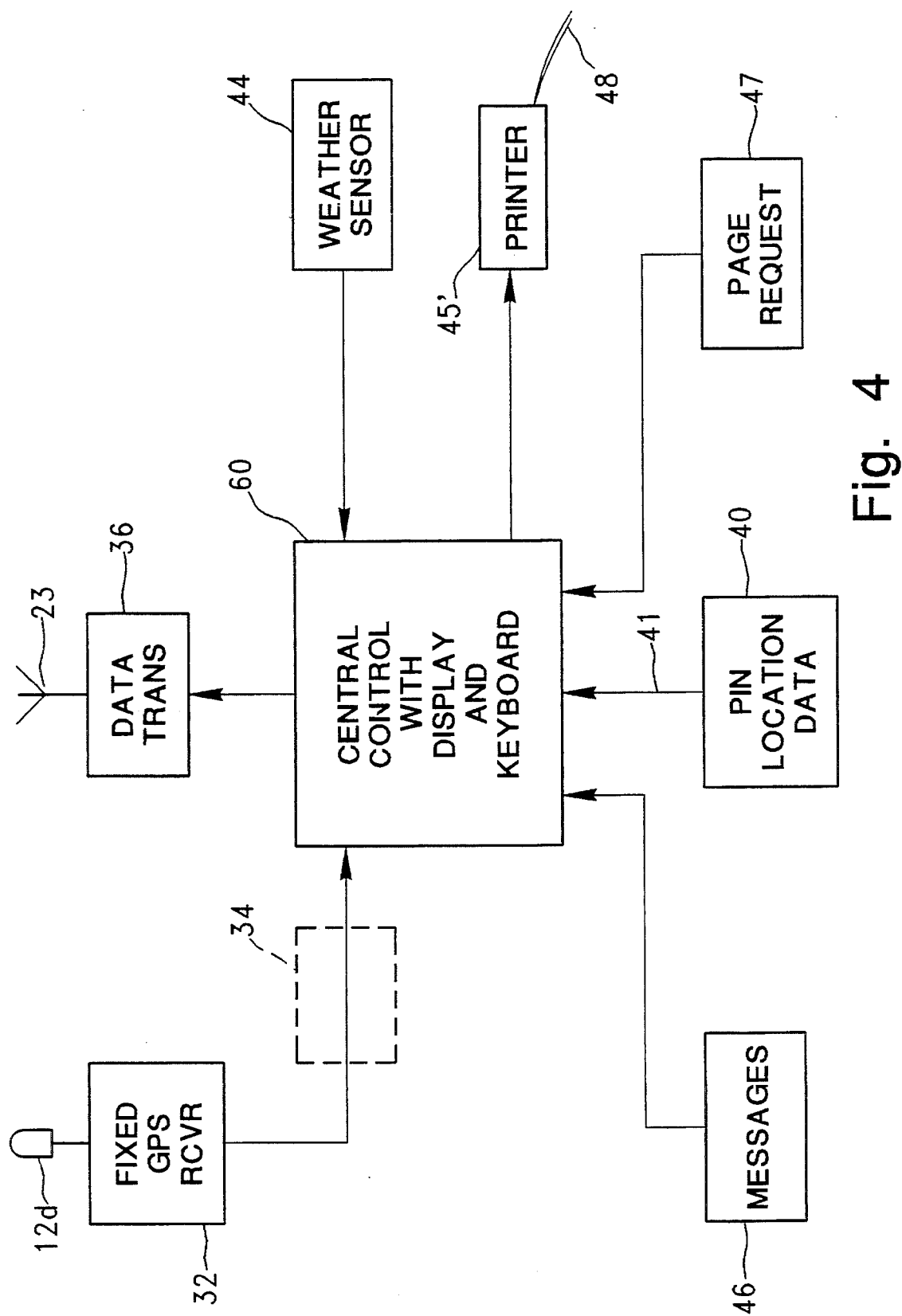

The central unit in each system, as represented in more detail in FIG. 4, further includes a data transmitter and antenna, 23, an error or correction signal generating device and a computer, with display and keyboard. The computer controls the functions of the fixed unit, makes calculations and stores data, such as the known coordinates defining the location of the fixed GP receiver and the known coordinates defining the locations of the various pins on the golf course.

Each mobile unit is transported over or along the golf course, from "hole" to "hole", as the golfer plays through the game of golf, With the mobile unit constantly moving, the location coordinates defining the location of the mobile unit are constantly changing and the specific coordinates are unknown to the specific mobile unit. Thus, the mobile unit or mobile GP receiver has no reference which can be used to distinguish the unstable and indefinite location coordinates derived from navigation signals, in whole or in part. The fixed unit or GP receiver knows, as previously discussed, the true, stable and definite coordinates which define its unchanging location so that when the fixed unit receives navigation signals and derives the unstable and indefinite location coordinates from the navigation signals, the fixed unit has a reference with which to compare the unstable and indefinite coordinates for determining the differential between the true, stable, known coordinates and the unstable, indefinite and false coordinates. With this capability, the fixed unit, using a signal generator, generates a correction or error signal which corresponds to the inverse of the differential between the two sets of location coordinates. The correction or error signal is transmitted to the mobile unit which uses the correction or error signal to eliminate the instability and indefiniteness in the location coordinates, derived from navigation signals, defining its location. The mobile unit, upon receipt of the correction or error signals, develops stable and definite location coordinates defining the location of the mobile unit from the unstable, indefinite location coordinates, and further process the stable definite coordinates into additional stable and definite location coordinates, defining the location of the golf ball on the fairway.

A global position receiver or GP receiver may be similar to an instrument with the same or similar identification used by personnel on boats or ships to determine the location of the boat or ship from signals received from navigation satellites, in space. The instrument is a radio receiver and antenna, tuned to receive navigation signals from navigation satellites, in space, and includes instrumentation, such as a computer or minicomputer, for example, for deriving data from the navigation signals which defines the global position of the antenna receiving the navigation signals, in terms of a global grid. The location data defining such global position is referred to herein as location data or location coordinates or a set of location coordinates or coordinates. The device or the instrumentation for receiving navigation signals is readily available, for purchase, over-the-counter, in electronic speciality stores and in many boating and ship equipment stores.

Attention is directed to mobile cart M-1, in FIG. 1, which represents other mobile carts in the same system; including the hand-drawn cart M-3, as far as systems functions are concerned. Mobile cart M-1 transports a mobile unit of the system, represented by the box GPR-1. Box GPR-1 includes a mobile GP receiver, coupled to the antenna 12, tuned for receiving navigation signals from navigation satellites 10. The mobile GP receiver converts the navigation signals received from the satellites into location Data, defining the location of the mobile unit or golf cart.

The navigation signals received by the mobile GP receiver contain noise and/or deviation signals which make the location data derived from the navigation signals unstable and indefinite, and, because of the instability and indefiniteness of the location data, the mobile GP receiver is unable to distinguish between the true location data and the false location data on the derived location data.

As the mobile GP receiver receives navigation signals and derives location data from such signals, the fixed GP receiver receives concurrently transmitted navigation signals from navigation satellites, the navigation signals containing noise and/or deviation signals. The fixed GP receiver derives location data from the navigation signals, defining the location of the fixed GP receiver, the derived location signals being unstable and indefinite, However, the fixed unit is unmoving and knows it own location, in location coordinates or data. The fixed unit compares the derived unstable and indefinite location data with known, true, stable and definite location data and generates correction or error signals corresponding to the differential between the two sets of data. The correction or error signals are transmitted via antenna 23 to the mobile unit which receives the transmission via antenna 22. The error signals are used by the mobile unit to adjust the location data, defining the location of the mobile unit, derived from the navigation signals, into stable, definite location data that defines the true location of the mobile unit, in stable, definite location coordinates.

Stable, definite location coordinates, defining the location of the mobile unit having been obtained, the location of the golf ball, on the fairway may now be obtained in location coordinates. The location coordinates defining the location of the mobile cart or unit are adjusted by the distance and direction of offset of the ball from the defined location of the mobile cart. The adjusted location coordinates define the location of the golf ball in stable, definite location coordinates.

As represented in FIG. 1, the mobile unit is assumed positioned on the fairway, in close proximity to the golf ball 5. The direction and the distance that the ball lies from the mobile unit or golf cart may be estimated and/or determined by use of a ball locating device, represented at 25. The ball locating device may be electro-mechanical or may be electronic with a display on the mobile computer monitor or display. An input corresponding to the distance and direction of offset of the ball from the mobile cart is applied to the computer in the mobile unit and the computer adjusts the location coordinates defining the location of the mobile unit or cart, into location coordinates defining the location of the golf ball on the fairway.

Thus, the exact location of the golf ball on the fairway, in location coordinates may be obtained and, as previously discussed, the exact location, in location coordinates, of the hole 17 on the green 18 has been determined and preserved. Those coordinates defining the location of the hole 17 may be compared with the coordinates defining the location of the golf ball 5 and the distance between the golf ball 5 and the hole 17 may be calculated by simple mathematics.

Figure 2:
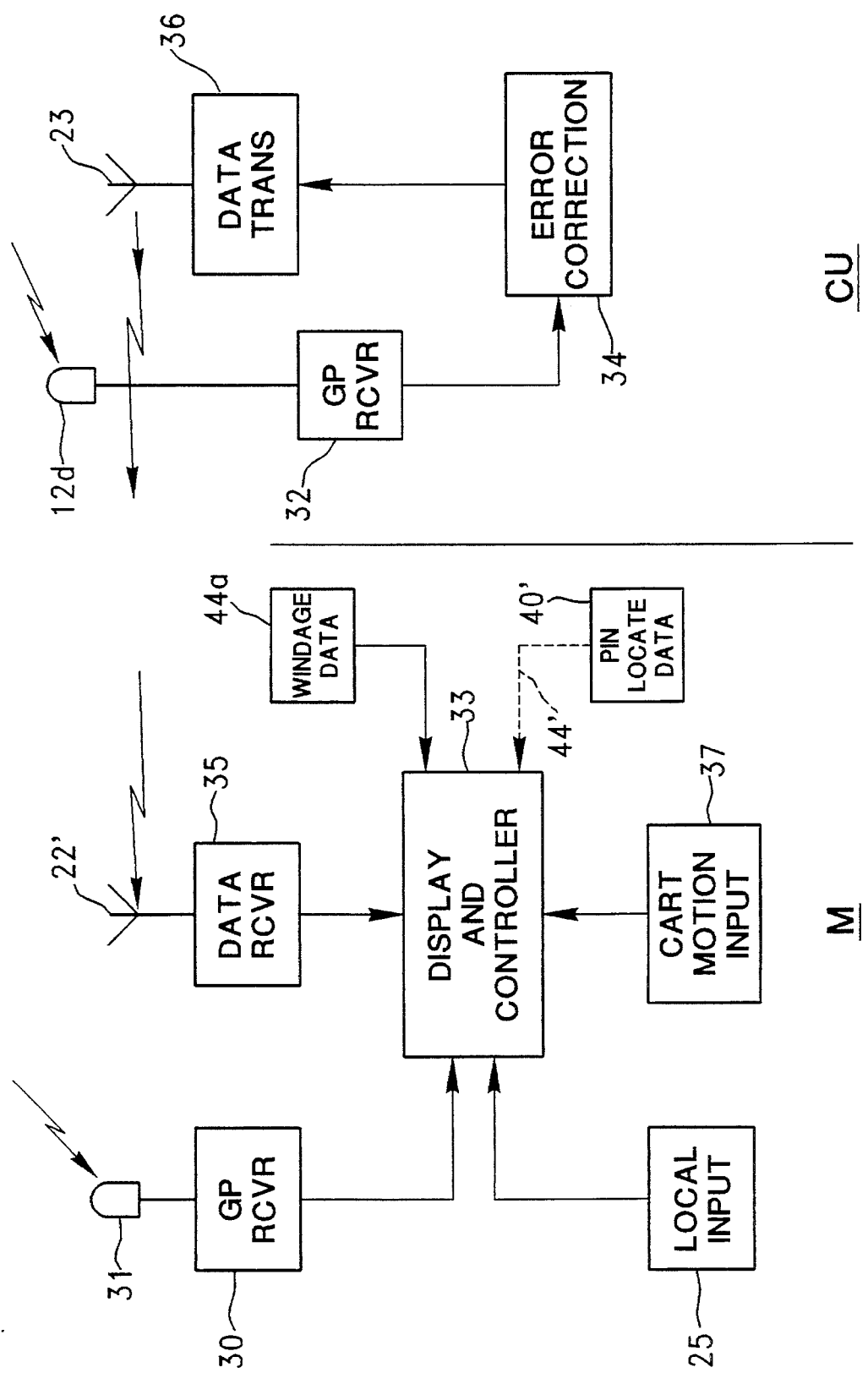
FIG. 2 is a block diagram of the basic distance measurement system of the invention.

Referring to FIG. 2, a block diagram representing the present invention, in basic system form is represented. A central unit, C.U. includes at least a fixedly located GP receiver 32 and antenna 12d, tuned for receiving navigation signals from navigation satellites, and an Error Correction device 34 and Data Transmitter 36 with antenna 23. The fixed GP receiver and antenna which may be located at any convenient location, is represented as located with the other apparatus of the central unit.

The GP receiver receives navigation signals continuously and converts or derives from such signals location data, defining the location of the GP receiver. As previously discussed, the location data derived from the navigation signals transmitted by navigation satellites define the location in unstable and indefinite location coordinates. The unstable and indefinite location data or coordinates are applied to the Error Correction Device 34.

The Error Correction device 34 may be a signal comparator, or other device which receives and compares two or more signals and provides an output corresponding to the differential between the compared signals. The output of the Error Correction Device 34 is herein referred to as an error or correction signal or signals.

The Error Correction Device 34 generates error correction signals by comparing two sets of signals, on an on-going basis. One set of signals are location coordinates, derived from navigation signals received by the fixed GP receiver. This set of location coordinates change, with time, as a function for the noise and/or deviation signals on the navigation signals received from navigation satellites by the fixed GP receiver. The changing location coordinates are unstable, indefinite and define both true and false locations of the fixedly located GP receiver. The other set are reference location coordinates, previously determined and stored, that do not change with time and define the true location of the GP receiver in stable, definite and consistent location coordinates.

The unstable, indefinite and changing location coordinates are applied to the Error Correction Device by the fixed GP receiver. The reference location coordinates, which are definite and unchanging, which have been previously determined and preserved, are stored in the Error Correction Device. The two sets of coordinates are compared and error Or correction signals, corresponding to the inverse of the difference or differential between the coordinates, are generated. The error or correction signals are applied to the Data Transmitter 36, for transmission via the antenna 23 to the mobile units in the system.

As will be appreciated, the error or correction signals transmitted by the data transmitter to the mobile units may be correction signals for correcting the navigation signals per se, or may be correction signals for correcting the location coordinates. The error or correction signals essentially define shifts in navigation signals transmitted by satellites or in the coordinate data defining location.

The mobile unit M, which represents any of a plurality of mobile units in the system, includes at least one mobile GP receiver 30 and an antenna 31, tuned for receiving navigation signals from one or more satellites 10. The mobile unit M also includes a Display and Controller 33, and a Data Receiver 35 which receives error or correction data via antenna 22' from the central unit CU. The error or correction data is used by the controller 33, to provide true, stable coordinates defining the location of the mobile unit, Local Input 25 represents input defining the offset of the golf ball from the mobile unit and is used to adjust the coordinates defining the location of the mobile unit into coordinates defining the location of the golf ball on the fairway.

Figure 3:
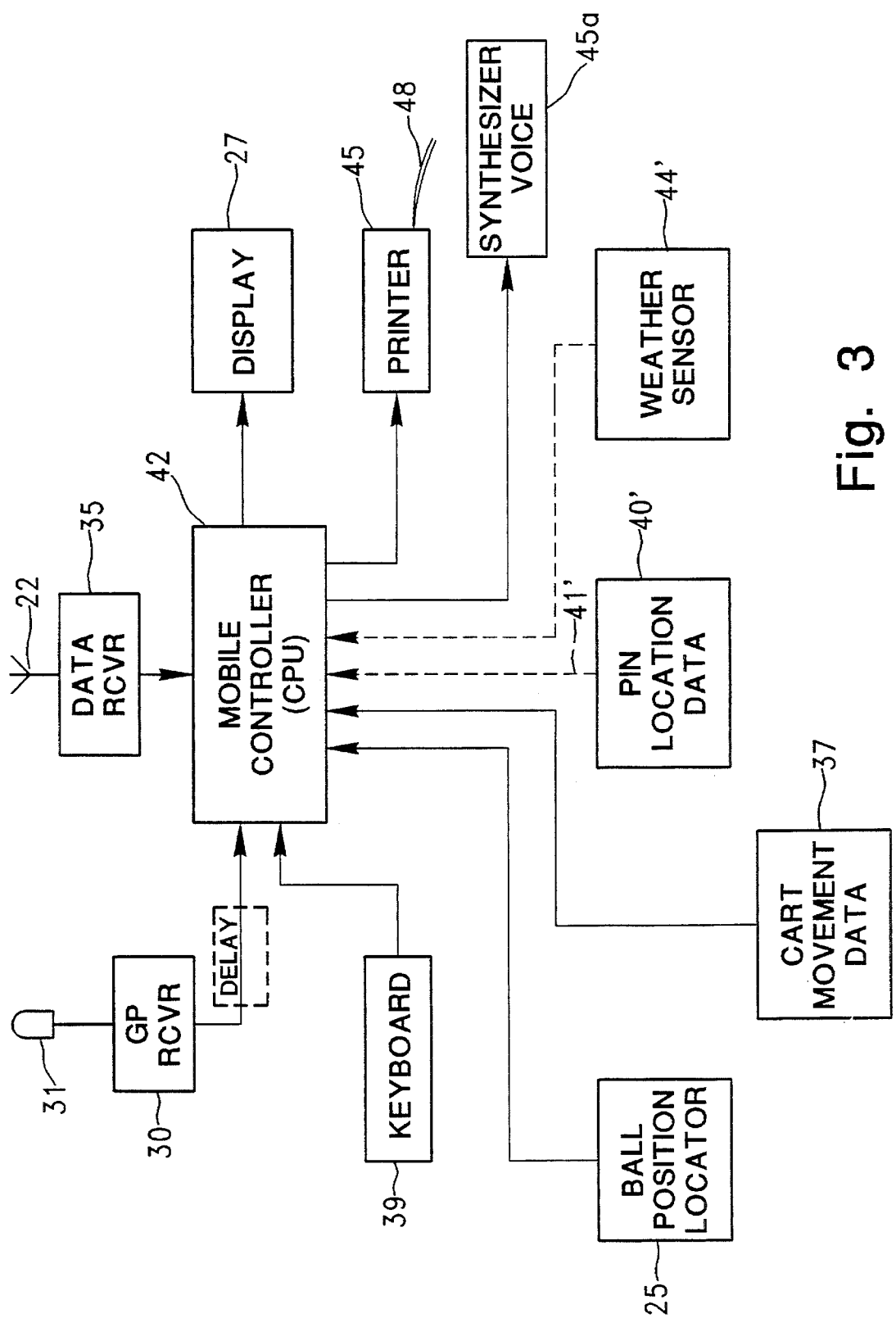
FIG. 3 is a block diagram of a mobile unit including a mobile global position receiver used in the FIG. 4 is a block diagram of central, fixed unit including a fixedly located global position receiver used in the system.
Figure 6:
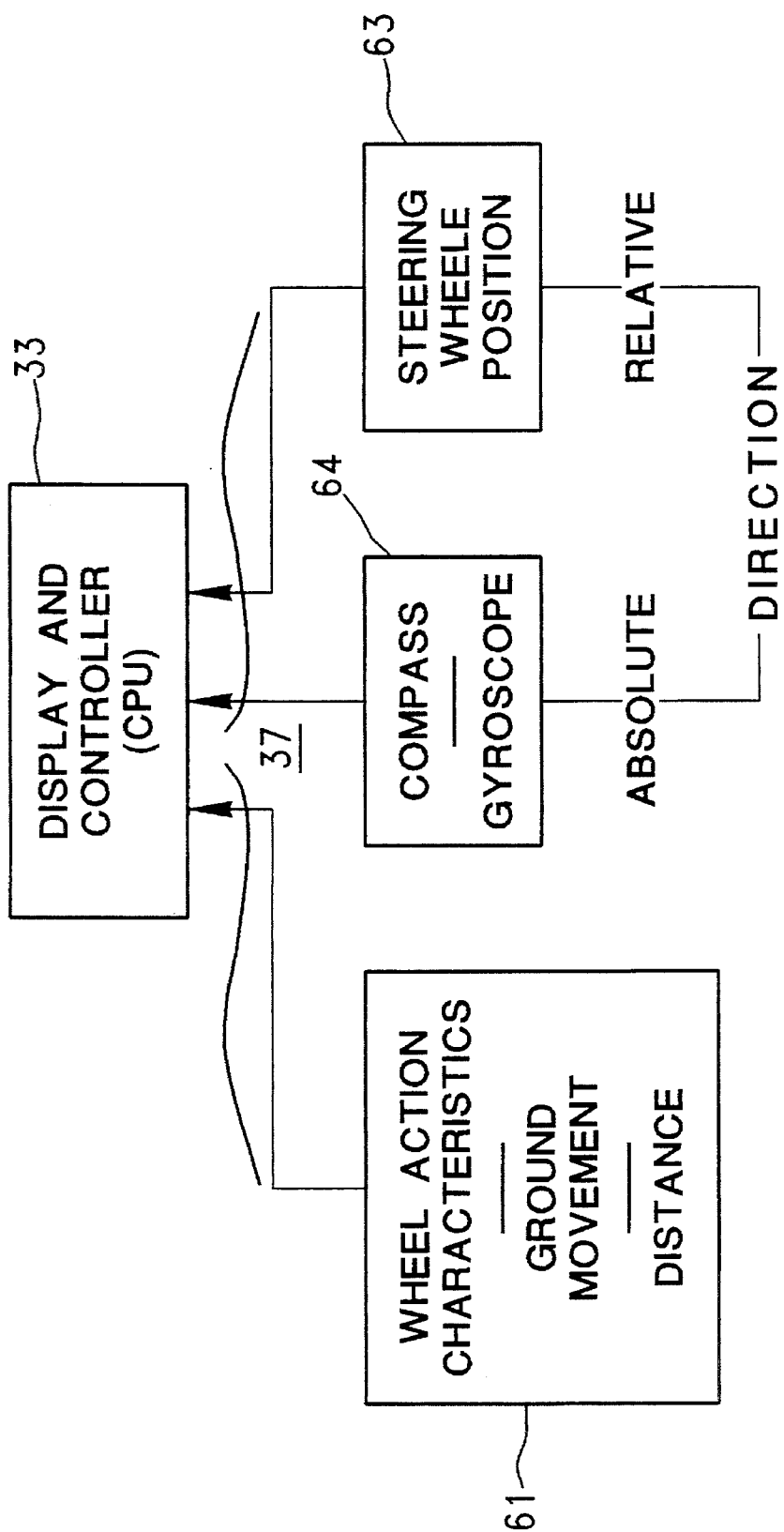
FIG. 6 is a block diagram of cart movement detection apparatus, with input into the controller CPU.

In order to measure the distance between the golf ball, on the fairway, and the pin, on the green associated with the fairway, the location of both the ball and the pin are needed. Pin Locate Data 40' may be locally stored or may be stored in the central unit, represented in FIG. 4. The broken line 41' in FIGS. 2 and 3, represents that the Pin Locate Data may be stored locally, in the mobile unit, or, as represented in FIG. 4, the Pin Location Data may be stored in the central unit and transmitted to the mobile units, as desired. In order to ensure positive location of the mobile unit or cart during signal processing, a cart movement data is provided, Cart movement detection apparatus, represented in FIG. 6, provides signals representing movement of the cart. The cart motion input may be used to update to location of the cart, should the cart be moved during signal processing.

The navigation signals received by the fixed GP receiver are received on an on-going basis so that when a mobile GP receiver in the system receives navigation signals for processing into ball location defining coordinates, the navigation signals received by the mobile unit are concurrent with the navigation signals received by the fixed GP receiver and each contains the same noise and/or deviation signals. The signals received by the mobile unit are converted into data defining the location of the mobile unit. However, the coordinates derived from the navigation signals change and/or shift, as the noise and/or deviation signals appear in the navigation signals, making the defined location of the mobile unit unstable, indefinite and inaccurate. The computer 33, in the mobile unit, receives the unstable, indefinite and inaccurate signals or coordinates from the mobile GP receiver 30 and also receives the error signal, from the central unit, through the data receiver 35. The error signal is combined with the unstable, indefinite and inaccurate signals or coordinates, eliminating the shifts in the coordinates defining the location of the mobile unit. The resultant coordinates are stable and define the location of the mobile unit positively and accurately.

The local input 25 represents the input defining the distance and direction between the location of the mobile unit and the location of the golf ball on the fairway. This input may be added to the stable coordinates to adjust the location coordinates. The adjusted coordinates will define the location of the golf ball on the fairway in stable, definite and accurate coordinates.

One way to eliminate the effect of noise and/or deviation signals on navigation signals received by a mobile GP receiver is to receive navigation signals from navigation satellites with a fixedly located GP receiver, the location of which is known. Process the received navigation signals into a first coordinate data defining a location of the fixed GP receiver. The first coordinate data will be unstable and indefinite in defining the location of the fixed GP receiver because of the noise and/or deviation signals on the navigation signals. Compare the first coordinate data with previously determined coordinate data defining the known location of the fixed GP receiver and generate error coordinate data corresponding to the differential between the first coordinate data and the previously determined coordinate data. Receive concurrently transmitted navigation signals by a mobile GP receiver and process the received signals into second coordinate data defining a location of the mobile GP receiver. Send the error coordinate data, generated by the fixed receiver, to the mobile GP receiver and correct the second coordinate data with the error coordinate data, providing an adjusted coordinate data, defining the location of the mobile GP receiver in stable, definite coordinates.

Another way to eliminate the effect of noise and/or deviation signals on navigation signals received by the mobile GP receiver, is to generate an error or correction signal corresponding to the inverse of the noise and/or deviation signals by a fixedly located GP receiver and send the error or correction signal to the mobile unit. By use of an electronic delay, represented in FIG. 3, for example, between the output of the mobile GP receiver and the input of the mobile computer, the output of the mobile GP receiver is delayed so that the signal or data applied to the mobile computer from the mobile GP receiver is received in phase with the error or correction signal received from the data transmitter. The error or correction signal may then be combined with the navigation signal and the effect of the noise and/or deviation signals on the navigation signal may be eliminated. Other methods may be used if desired.

FIG. 3, the block diagram representing a mobile unit of the system, in more detail, represents a mobile GP receiver 30 and antenna 31, a Controller (CPU) 42 and a keyboard or pad 39, or any functional equivalent. The controller or computer is used to control the functions of the mobile unit, to make calculations and to receive, store, retrieve and use data. The keyboard or pad is used to enter data manually into the computer. A monitor or display 27 is provided to visually display data entered into or requested of the computer. The display may also visually display the location and distance measurements calculated by the computer. The printer 45 may print out a hard copy 48 of data, as requested. A synthesizer device 45a may also be included to speak out the data visually displayed on the display or monitor 27 and/or printed out in hard copy 48, as desired. The GP receiver 30 and antenna 31 may be as previously described.

The Ball Position Locator 25 represents apparatus or equipment previously discussed relative to FIG. 2 and represented as Local Input. A ball pointer may be in the form of a swivel pointer 25, represented in FIG. 1, which may be an electro-mechanical device or may be in the form of an electronic device represented in FIG. 5, for example.

Figure 5:
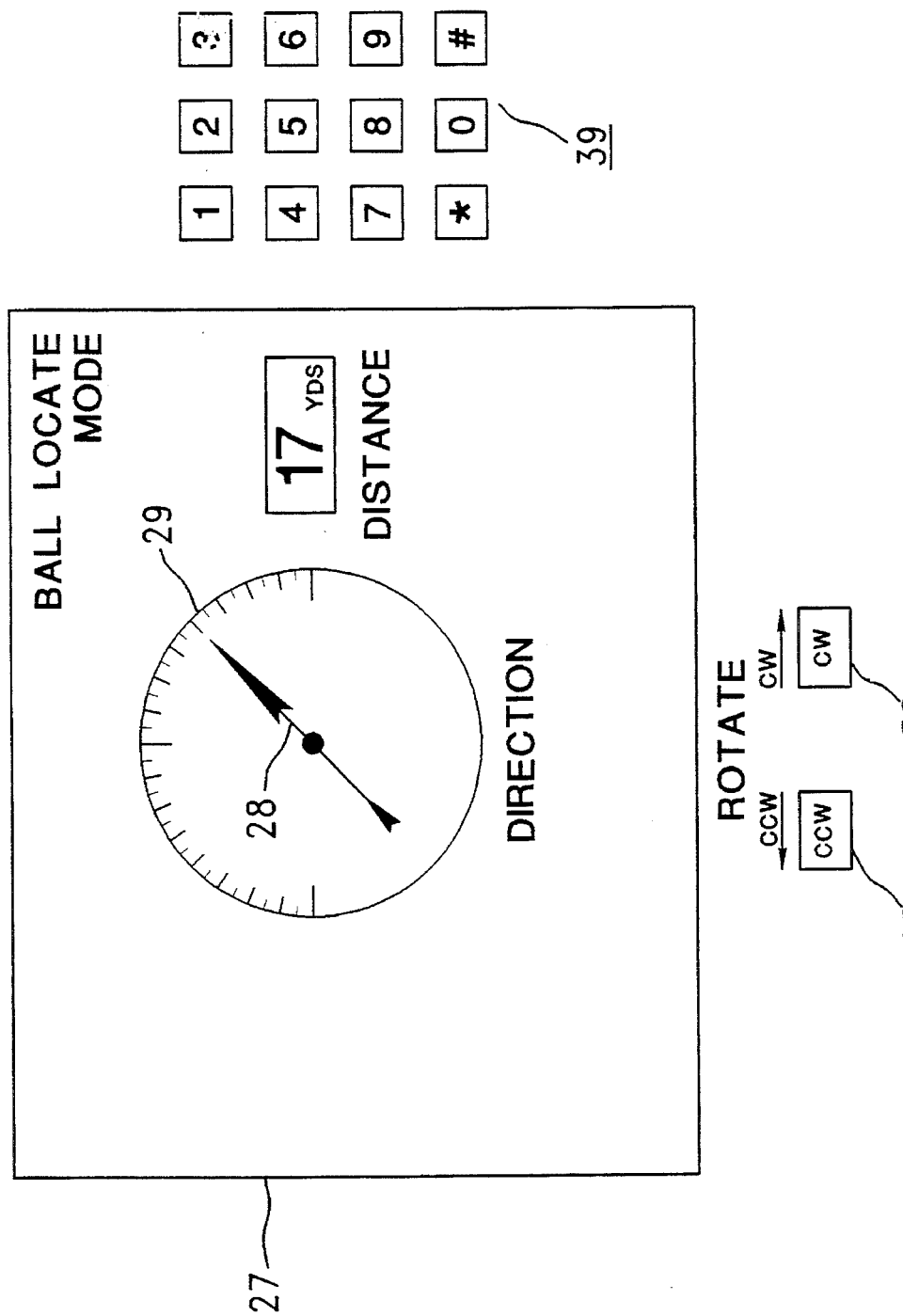
FIG. 5 is a representation of the monitor and key board on the mobile unit of the invention, in Ball Pointing Mode.

FIG. 5 represents a display 27, shown in Ball Locate Mode. A pointer 28 is displayed in part of a graduated circle 29, The pointer may be rotated in a clockwise direction or a counterclockwise direction by pressing one of the buttons 37 or 38, as marked. The pointer is used to point at the golf ball positioned on the fairway. The arcuate position of the pointer may be translated in the direction the ball lies from the golf cart. The distance of the ball from the golf cart may be estimated and entered numerically on the display by the key board. The data displayed on the screen or monitor may be converted into electrical data and used to adjust the stable coordinates defining the location of the mobile unit into adjusted, stable coordinates that define the location of the golf ball, on the fairway.

The generation of the coordinates defining the pin on the green, were previously discussed. Data defining the location of the various holes or pins on the greens of the golf course may be generated, preserved and stored in a memory, in the central unit, such as represented by block 40 in FIG. 4. This data may be communicated to the mobile units in the system, on request. Alternatively, the data on pin location may be stored in each of the mobile units.

The mobile unit, represented in FIG. 3, may include a printer 45, so that a hard copy, 48 may be printed out, on request. A printer, 45' and hard copy printout 48 are also represented in FIG. 4 as being part of a central unit.

The present system may include a weather sensor, such as block 44', connected to the mobile computer, the connection represented by broken line, in FIG. 3 or a weather sensor 44 may be connected to the computer in the central unit, as represented in FIG. 4, as connected by solid line. If the weather sensor is associated with the central unit, weather information may be transmitted out to the mobile units, should a change in weather conditions develop. However, because of the large and many changes in geography of a golf course, it is preferred that each mobile unit include a windage sensor, represented as 44a, in FIG. 2. A windage sensor may provide windage, in direction and velocity that may effect the flight of the ball, both in range and in direction. Windage data may be calculated into the ideal flight path of the ball, for example, between the location of the ball and the pin and for determining the apparent distance between the location of the golf ball and the pin, as opposed to the absolute distance between the golf ball and the pin. From the ball flight data, a recommendation of club selection may be made by the computer.

Block 37, in FIG. 3, represents equipment and/or apparatus for monitoring wheel action characteristics, represented in more detail in FIG. 6. In order to sense movement of the golf cart, the golf cart wheel action characteristics, that is, forward rotation, backward rotation and the differences in rotational movement between pairs of wheels, may be sensed. This may be done to provide data representing the distance travelled by the golf cart from some predetermined position and whether or not the distance travelled was in a straight line. A magnetic compass and/or a directional gyroscope may be used to provide data on the absolute direction of travel of the golf cart while apparatus monitoring the rotational position of the steering wheel may provide data on the relative direction of travel of the golf cart.

FIG. 4 represents, in more detail, a block diagram of the central unit of the system, some of which has been discussed. Messages and/or paging may be selectively transmitted to the mobile units, although such capability is considered optional. It should be understood that each mobile unit includes a portable computer and that each central unit includes a computer. These components may be similar to any corresponding apparatus in the prior art.

Although the present invention has been described relative to determining a measurement of the distance between a golf ball, positioned on the fairway of a golf course, and a hole, on the green associated with the fairway, it is apparent that the invention may be used for determining a measurement of the distance between other objects, when the defined location of one of the objects is known and the defined location of the second object is unknown.

Thus there has been described a system and method for measuring the distance between two objects, one in a defined location, the other in an undefined location, using navigation signals. A preferred system and method has been described along with alternatives. Accessory equipment associated with the system and method has been suggested. Other changes and modifications may be made, as will become apparent to those skilled in the art, without departing from the invention.

What is claimed is:

1. A system for providing a player on a golf course with the distance between a golf ball on said golf course and a stationary object on said golf course, where the location of said object is previously known and defined by object location data, said system comprising:

a) a first unit transmitting an error data signal to each of a plurality of mobile units on said golf course which mobile units are remotely spaced from said golf ball, said first unit including;

i) a fixed receiving means, positioned in a fixed location, said fixed location being accurately defined by known location data, said known location data preserved and stored for use, said receiving means receiving navigation signals from navigation satellites and deriving, from said navigation signals, first location data generally defining said fixed location, ii) a location data comparing means for receiving and comparing said known location data and said first location data and for generating said error data signal corresponding to differences between said known location data and said first location data, and iii) data transmission means for transmitting said error data signal to said mobile units;

b) each of said mobile units including;

i) a mobile receiving means for receiving navigation signals from navigation satellites and for deriving, from said navigation signals, second location data generally defining the location of said mobile unit, ii) data receiving means for receiving said error data signal transmitted from said data transmission means, iii) a data adjusting means for receiving said second location data from said mobile receiving means and for receiving said error data signal from said data receiving means and for adjusting said second location data with said error data signal for generating a third location data accurately defining the location of said mobile unit, iv) a golf ball locating means for measuring and determining ball distance data defining the distance said golf ball is positioned from said location of said mobile unit and for determining a ball direction data defining the direction said golf ball is positioned from said mobile unit, v) a data shifting means for receiving said third location data from said data adjusting means and for receiving said ball distance data and said ball direction data from said golf ball locating means and for shifting said third location data by said ball distance data and said ball direction data for generating a ball location data defining the location of said golf ball, vi) a calculation means for receiving said object location data and said ball location data and for calculating a distance between said golf ball and said object on said golf course.

2. The system of claim 1 wherein said object is a hazard on said golf course.

3. The system of claim 1 wherein said object is a hole on a green of said golf course.

4. The system of claim 1 wherein said distance between said golf ball and said object is expressed in yardage.

5. The system of claim 1 wherein said error data signal corresponds to an inverse of the differences between said known location data and said first location data.

6. A system for measuring a distance between a golf ball on a golf course and a hole on a green of said golf course where the location of said hole is stationary and previously known and defined in hole location data, said system comprising:

a) a first receiver means in a first location, said first location known and defined in fixed location data, said first receiver means receiving navigation signals transmitted by navigation satellites and deriving a first location data from said navigation signals, said first location data defining said first location;

b) a comparator means for receiving and comparing said fixed location data and said first location data and for generating an error data signal corresponding to a differential between said fixed location data and said first location data;

c) a data transmitter means for receiving said error data signal from said comparator means and for transmitting said error data signal to mobile unit means in said system which mobile unit means are remotely spaced from said golf ball;

d) each said mobile unit means including:
   i) a second receiver means, transported by said mobile unit means, said mobile unit means positionable, on demand, at a second location, on said golf course, said second location being an undefined location, said second receiver means for receiving navigation signals from navigation satellites and for deriving a second location data from said navigation signals defining said second location;
   ii) a data receiving means for receiving said error data signal transmitted by said data transmitter means;
   iii) a data adjusting means for receiving said second location data and said error data signal and for adjusting said second location data by said error data signal for generating an adjusted location data defining said second location:
   iv) a distance measuring means for determining a distance and a direction between said golf ball and said second location and for shifting said adjusted location data in accordance with said distance and direction determined for generating a ball location data defining a location of said golf ball on said golf course, and
   v) calculation means for calculating a difference between said ball location data and said hole location data and for converting said difference into a measurement of the distance between said golf ball on said golf course and said hole on said green.

7. A system for measuring a distance as in claim 6 and in which said measurement of distance is yardage.

8. A system for measuring a distance as in claim 6 and in which said first receiver means receives navigation signals on an ongoing basis.

9. A system for measuring a distance as in claim 6 and in which said error data signal corresponds inversely to said differential between said known location data and said first location data.

10. A method for measuring the distance between a golf ball positioned on a golf course and a stationary hole on a green of said golf course wherein the location of the hole is known by hole location data, comprising the steps of:
    a) transporting a first global position receiver along the golf course mounted to a mobile cart and stopping said mobile cart at an undefined location on said golf course which mobile cart is remotely spaced from said golf ball;
    b) positioning a second global position receiver in a fixed location and calculating a fixed location data defining said fixed location and preserving said fixed location data;
    c) operating said second global position receiver, on an ongoing basis, from said fixed location for receiving first navigation signals from navigation satellites;
    d) deriving first location data from said first navigation signals for defining said fixed location by said first navigation signals;
    e) comparing said fixed location data with said first location data and detecting a differential between said fixed location data and said first location data;
    f) generating an error signal corresponding to an inverse of said differential;
    g) operating said first global position receiver from said undefined location for receiving second navigation signals from said navigation satellites;
    h) deriving a second location data from said second navigation signals for defining said undefined location;
    i) adjusting said second location data with said error signal for generating a first adjusted location data defining said undefined location;
    j) calculating a ball distance and a ball direction between said golf ball and said undefined location, as defined by said first adjusted location data;
    k) adjusting said first adjusted location data by said ball distance and said ball direction for generating a ball location data, defining a location of said golf ball; and
    l) calculating a differential, in location data, between said hole location data and said ball location data and converting said differential into a measure of distance.

11. A method for measuring distance as in claim 10 and, between steps h) and i) further including the step of
    delaying said second location data so that said second location data is in phase with said error signal.

12. A method for measuring distance as in claim 10 and further including the step of:
    displaying said measure of distance between said golf ball location and said hole visually.

13. A method for measuring distance as in claim 12 and further including the step of:
    printing said measure of distance on a substrate.

14. A method for measuring distance as in claim 12 and wherein said measured distance is yardage.

15. A method of measuring a distance as in claim 10 and further including the step of:
    applying said differential data converted into said measure of distance to a speech synthesizer for audibly speaking said measure of distance.

16. A method for measuring the distance between a golf ball positioned on a fairway of a golf course and a hole on a green on said golf course, the location of said hole defined by a hole location data, comprising the steps of:
    a) positioning a mobile cart transporting a mobile global position receiver on said golf course, in close proximity to said golf ball positioned on said fairway;
    b) receiving navigation signals from one or more navigation satellites with said mobile global position receiver and converting said navigation signals into a first location data defining a first location of said mobile cart;
    c) operating a fixed global position receiver from a known, fixed location, defined by known location data, for receiving navigation signals from said one or more navigation satellites and converting said navigation signals into a second location data defining said known, fixed location;
    d) comparing said second location data with said known location data and generating a first error signal corresponding to a first differential between said second location data and said known location data;
    e) changing said first location data in accordance with said first error signal into a first adjusted location data defining said first location of said mobile cart;
    f) measuring a distance and a direction between said mobile cart as defined by said first adjusted location data, and said golf ball positioned on said fairway and changing said first adjusted location data in accordance with said distance and said direction so measured for generating a ball location data defining the location of said golf ball on said fairway; and
    g) calculating a second differential between said ball location data and said hole location data and converting said second differential into a first distance.

17. A method for measuring a distance as in claim 16 and further including the steps of:
i) displaying said first distance on a display means.

18. A method for measuring a distance as in claim 17 and further including the step of:
ii) printing a hard copy of said first distance on substrate, 19. A method for measuring a distance as in claim 16 wherein said first distance is measured in yardage.

20. A method for measuring a distance as in claim 16 wherein said first error signal corresponds inversely to said first differential.

21. A method for determining a distance between a golf ball positioned on a golf course and a stationary object on the golf course, where the location of said object is defined in known and preserved location data, said method comprising the steps of:
a) operating a receiver from a fixed location defined accurately by a known location data, for receiving GPS navigation signals and for deriving, from said navigation signals, a first location data defining said fixed location;
b) comparing said known location data with said first location data and generating an error data corresponding to a differential between said known location data and said first location data;
c) transmitting said error data to mobile receivers on the golf course;
d) operating a mobile receiver, which is remotely spaced from said golf ball, from an undefined location on said golf course for receiving GPS navigation signals and deriving, from said navigation signals, a second location data defining said undefined location of said mobile receiver;
e) receiving said error data and applying said error data to said second location data for adjusting said second location data with said error data for generating an adjusted location data defining said undefined location;
f) determining the distance and direction between said undefined location as defined by said adjusted location data, and said golf ball and adjusting said adjusted location data by the determined distance and direction for generating a ball location data defining the location of said golf ball;
g) comparing said ball location data and said location data and calculating a difference data between said ball location data and said location data and converting said difference data into a measurement of distance between said golf ball and said object.

22. A method for determining as in claim 21 and in which step a) includes operating said fixed receiver on an ongoing basis.

23. A method for determining as in claim 21 and in which said error data corresponds inversely to said differential.

24. A method for determining as in claim 21 and further including the steps of:
i) sensing the direction and velocity of wind at said undefined location and defining said direction and velocity of wind in a wind data, said wind data being compatible with said ball location data;
ii) determining a direct flight path of a golf ball between the location of the golf ball, as defined by said ball location data and the location of said object, as defined by said location data, and converting said direct flight path into flight path data compatible with said wind data; and
iii) adjusting said flight path data by said wind data for generating an apparent flight path data for defining an apparatus flight path of said golf ball.

25. A method for measuring a distance as in claim 24 and further including the step of:
printing out the calculated distance on a substrate.

26. A method for determining as in claim 24 and further including the step of:
displaying said apparent flight path of said golf ball.

27. A method for measuring the distance between a golf ball positioned on a golf course and a stationary object on said golf course, wherein the location of said object is defined in a known and preserved location data, said method comprising the steps of:
a) operating a navigation signals receiver from a predetermined location, said predetermined location defined by a known location data, for receiving navigation signals from navigation satellites and deriving from said navigation signals a first location data defining said predetermined location;
b) comparing said known location data with said first location data and generating an error data corresponding to a differential between said known location data and said first location data;
c) transmitting said error data to mobile navigational signal receivers on said golf course which mobile navigational signal receivers are remotely spaced from said golf ball;
d) operating a mobile navigation signal receiver transported by a mobile unit at an undefined location on said golf course, said navigation signal receiver receiving navigation signals from said navigation satellites and deriving from said navigation signals a second location data defining said undefined location of said mobile receiver unit;
e) receiving said error data by said navigation signal receiver transported by said mobile unit and applying said error data to said second location data for adjusting said second location data with said error data for generating an adjusted location data defining said undefined location;
f) monitoring movement of said mobile unit and generating a local data defining movement of said mobile unit during steps d) and e);
g) adjusting said adjusted location data with said local data for generating a second adjusted location data defining said undefined location;
h) determining a distance and direction between said undefined location, as defined by said second adjusted location data, and said golf ball and adjusting said second adjusted location data by said determined distance and direction for generating a ball location data defining the location of said golf ball; and
i) comparing said ball location data and said known and preserved location data and calculating a difference data between said ball location data and said known and preserved location data and converting said difference data into a measurement data defining the distance between said ball and said object.

28. A method for measuring as in claim 27 and in which step a) includes operating said navigation signals receiver on an on-going basis.

29. A method for measuring as in claim 27 and in which said object is a hole on a green associated with said fairway.

30. A method for measuring as in claim 27 and wherein said measurement data is in yardage.

31. A method for measuring as in claim 27 and further including the steps of;
- i) monitoring the direction and velocity of wind at said undefined location and converting wind direction and velocity into a wind data;
- ii) determining an absolute flight path of a golf ball between the location of said golf ball, as defined by said ball location data, and the location of said object, as defined by said known and preserved location data and converting said absolute flight path into a ball flight data compatible with said wind data; and,
- iii) adjusting said absolute flight path, as defined by said ball flight data with said wind data for generating an apparent flight path of said golf ball.

32. A method for measuring as in claim 31 and further including the step of:
- iiii) displaying said apparent flight path of said golf ball on a display means.

* * * * *